March 8, 1949.  F. W. DUNMORE  2,463,527
MEASURING POTENTIAL GRADIENTS IN SPACE
Filed Sept. 21, 1945  2 Sheets-Sheet 1

INVENTOR
FRANCIS W. DUNMORE
BY
ATTORNEY

March 8, 1949.   F. W. DUNMORE   2,463,527
MEASURING POTENTIAL GRADIENTS IN SPACE
Filed Sept. 21, 1945   2 Sheets-Sheet 2
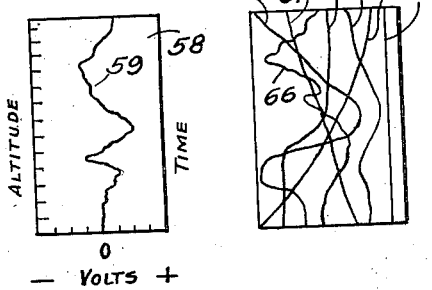
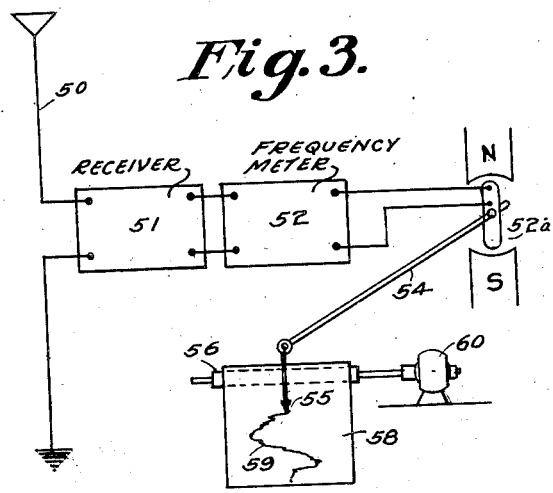
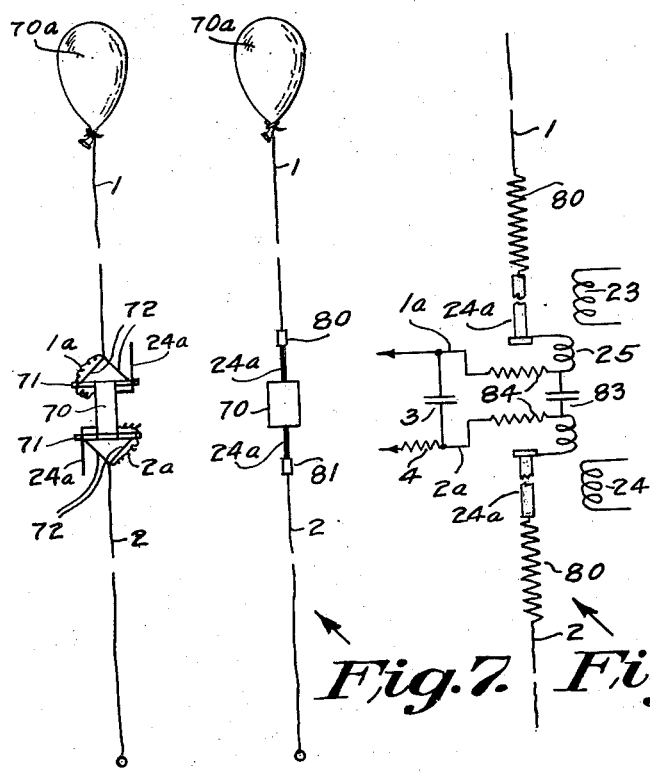
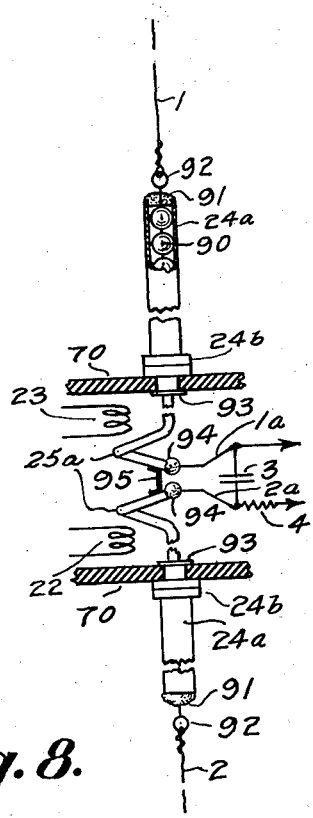
INVENTOR
FRANCIS W. DUNMORE
BY
ATTORNEY Patented Mar. 8, 1949

2,463,527

UNITED STATES PATENT OFFICE 2,463,527

MEASURING POTENTIAL GRADIENTS IN SPACE

Francis W. Dunmore, Washington, D. C.

Application September 21, 1945, Serial No. 617,889

7 Claims. (Cl. 250—1)

(Granted under the act of March 3, 1883, as amended April 30, 1928; 370 O. G. 757)

The invention described herein may be manufactured or used by or for the Government of the United States for governmental purposes without payment of any royalty thereon.

This invention relates to the use of radio on an object in space, for sending signals which are a function of the potential gradient existing at the location of the object.

Charged regions in the earth's atmosphere produce serious interference to radio reception on aircraft flying through them. The location of such regions should also be of value in weather forecasting.

Heretofore the only means of locating areas having potential gradients too small to produce lightning flashes was to obtain reports from pilots who happened to pass through them and experience the detrimental effects produced by them. This method is unsatisfactory, as it is the purpose of pilots to avoid such areas when possible.

The object of my invention is, therefore, to furnish information at ground points in any type of weather, of the magnitude and polarity of potential gradients existing at the location of an object in space carrying the potential gradient transmitter. In one form of my invention the device may be incorporated as part of a radiosonde transmitter, the altitude and location of which is continuously known; gradient measurements may therefore be made with respect to known points in space.

Briefly the simplest form of equipment for giving this information may consist of a balloon carrying a radio transmitter with audio oscillator modulation, the frequency of which is a function of the magnitude and polarity of the voltage applied to the grid of the audio oscillator tube. This bias voltage is obtained from the potential gradient picked up by a collector wire extending above the transmitter and by another suspended below the transmitter.

With no gradients (normal bias) the modulating frequency produces a midscale reading on the graphical recording equipment on the ground. A plus bias on one collector wire produces an increase from the midpoint in the recording frequency and vice versa. As the modulating frequency is a function both of the magnitude and polarity of any gradient, the graphical record may be in terms of voltage—within limits. The gradient is that between the two extreme points in space occupied by the collector wires.

In this simple form of apparatus, height may be determined by interrupting the potential gradient signal and putting into circuit any one of the many forms of altitude indicating devices used in radiosondes. Position may be determined by radio bearings.

In another form of my invention the potential gradient feature is switched into a regular rapid sequence type of radiosonde circuit so that the gradient record is recorded on the same graphical record as the temperature, pressure, humidity and light brightness.

The ground equipment required may be that now in general use by the Army, Navy and Weather Bureau for receiving and recording radiosonde signals.

Other and further objects of my invention will be apparent from the following detailed description, and the accompanying drawings. It is expressly understood however that these drawings are for the purposes of illustration only, and are not designed for a definition of the limits of my invention.

Referring to the illustration:

Fig. 3 shows an arrangement of receiving and recording apparatus.

Fig. 4 illustrates the type of graphical record obtained from the potential gradient transmitter of Fig. 1.

Fig. 5 shows a record typical of the circuit in Fig. 2.

Figs. 6 and 7 illustrate complete radiosonde balloon-transmitters embodying the invention, Fig. 8 illustrating the preferred coupling means employed in Fig. 7, and Fig. 9 an alternative arrangement.

Figure 1:
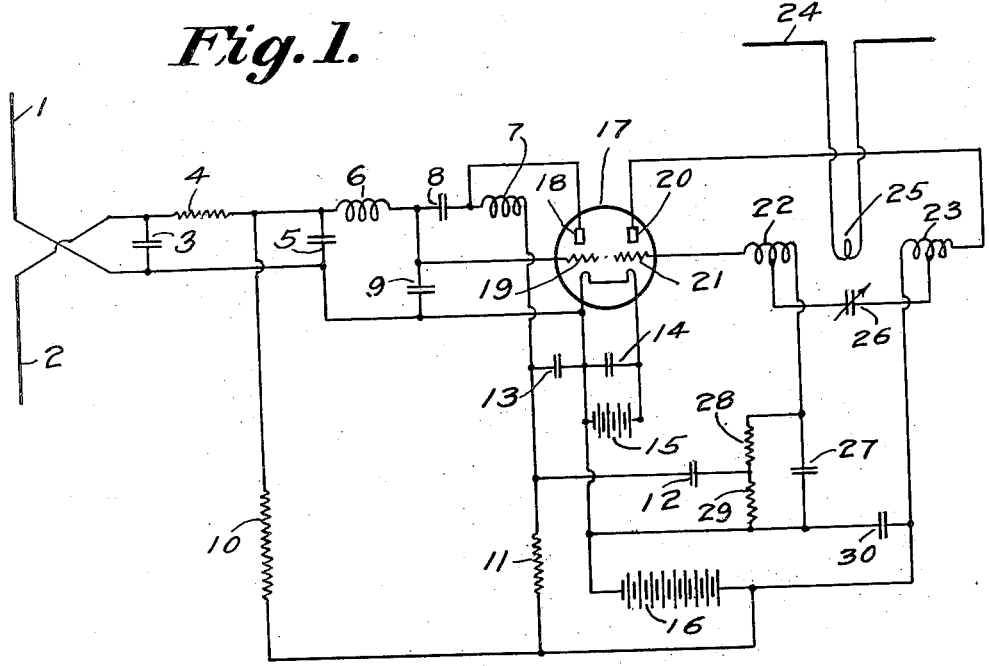
Fig. 1 is one form of potential gradient transmitter circuit arrangement to be carried by the object in space.
Figure 2:
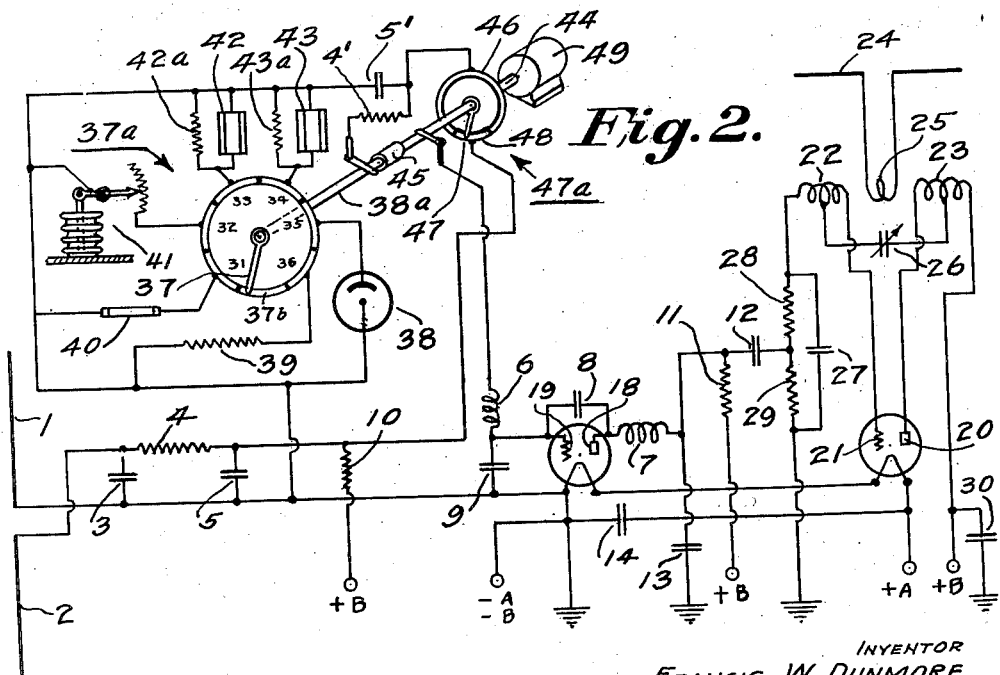
Fig. 2 shows another form of circuit for sending potential gradient signals along with the regular radiosonde signals.

Referring to the drawings more in detail, Fig. 1 shows one circuit arrangement of the transmitter carried aloft by a balloon or other means. In this circuit 1 is the upper voltage collector, extending above the balloon in Fig. 6, and 2 is the lower collector, hanging under the balloon in Fig. 6. 17 is a double triode which may be of the 1A5 type. The triode comprising plate 18 and grid 19 together with inductors 6 and 7, condensers 3, 5, 8, 9 and 12, resistors 4, 10, and 11, constitute the audio modulator portion of the circuit. The radio-frequency portion of the unit comprises the other triode of tube 17 consisting of plate 20, and grid 21; the oscillator coils 22 and 23, doublet coupling 25 and antenna 24, tuning condenser 26, coupling resistors 28 and 29, and by-pass condensers 27, 30, 13, and 14. Except for collectors 1 and 2, R. F. by-pass condenser 3, R. F. blocking impedance 4, and the biasing means herein shown as resistor 10 connected to "B" battery 16, the circuit of Fig. 1 is substantially that used in the radiosonde now standard with the Army, Navy and Weather Bureau. This same standard oscillator circuit is employed in Fig. 2, in which switch 47a connects the circuit alternately for R.-C. time-constant control by the usual radiosonde instruments, and for potential gradient bias control in accordance with the present invention.

In this illustrative arrangement the circuits of elements 18—19 form a squelch-oscillator having an oscillation frequency of say, 1 megacycle, determined by coils 6, 7, and condensers 8, 9. When switch 47 (Fig. 2) is on contact 46, condenser 5' and the various resistors of the associated network controlled by switch 37, form an R.-C. circuit controlling the rate at which the oscillation of oscillator 18—19 is squelched. In the standard radiosonde the squelch rate is controlled by variations of the resistance and/or capacity of the R.-C. circuits. The control in the case of the present potential gradient measuring device is differently effected. Here the normal radiosonde R.-C. circuits are eliminated, and new provision is made to control the rate of squelch by a change of biasing potential applied to the grid circuit in a novel manner. For this purpose means is provided to pick-up the static potential gradient and apply it across a small condenser 5 bridging from grid to cathode to modify a fixed positive bias applied to the grid to establish a basic squelch rate, resistance leak means being also provided between grid and cathode. In the preferred embodiment simplicity and minimum weight increase is accomplished by employing the high resistance 10 of, say, 8 to 10 megohms, connected from grid 19 to +B. Thus a grid leak path is provided from grid 19 through the resistor 10 and B battery to cathode, and at the same time a positive bias is given the grid without addition of C-battery biasing. The values of the small condenser 5 and high resistance 10 are so adjusted that the oscillator will have a predetermined basic rate of squelch, say 100 cycles per second, when no biasing potential change is imparted from collectors 1—2. When the collectors 1—2 apply potentials to the grid, algebraically added to the initial biasing potential, the rate of squelch of the oscillator 18—19 is altered as a function of the applied potentials.

In the circuit selected for illustration the high-frequency oscillator is likewise of the intermittent type. Its oscillation frequency is established by coils 22 and 23, condenser 26 and the tube constants. When the trigger oscillator 18, 19 goes into oscillation its plate current produces a voltage drop across plate resistor 11, which may have a value of, say, 50,000 ohms, and this potential drop is applied, through condenser 12, across resistance 29, forming part of the grid circuit resistance of the H. F. oscillator 20—21. Thus when oscillator 18—19 is in operation oscillator 20—21 is blocked, and when oscillator 18—19 is out of operation, oscillator 20—21 is functioning. In this way the H. F. oscillator 20—21 is caused to interrupt its oscillations at a modulation rate corresponding to the rate of squelch of oscillator 18—19, i. e., to partake of 100% modulation at that rate.

As above mentioned, the modulation frequency is adjusted to a mid-scale value of say 100 cycles as by means of condenser 5 and biasing resistor 10, when no voltage gradient is present on collectors 1 and 2. Then when collector 2 is + with respect to collector 1 the modulating frequency increases and vice versa. The amplitude and polarity of the gradient may be expressed in terms of frequencies once the apparatus has been calibrated. The R. F. by-pass condenser 3 serves to by-pass all radio-frequency disturbances picked up by the collectors, and may have a value, with 30-foot collector wires, for example, of say 0.01 mfd. The R. F. blocking impedance in such case, may have a value of several thousands ohms to a megohm or more; a 40,000 ohm resistor has been found satisfactory. The resistor 10 depending on the other constants, may be selected in the range of 5 to 20 megohms to obtain the desired bias.

In one circuit arrangement a + or − gradient of only a few volts is sufficient to vary the modulating frequency by 25 cycles or more.

In Fig. 2 is shown the potential gradient circuit in conjunction with a radiosonde circuit arrangement so that a gradient record is obtained along with the record of height, temperature, humidity, cloud height and reference. In this circuit the modulator and R.-F. oscillator are the same as shown in Fig. 1. The modulator circuit however is connected to the measuring devices by means of selector switches 47a and 37a. The former selects either the gradient circuit consisting of collectors 1 and 2, condensers 3 and 5, resistor 4 or the other selector switch 37a which in turn selects the meteorological measuring devices. Switch 47a consists of motor 49 revolving contact arm 47 through shaft 44 which arm contacts commutators 46 and 48. Segment 48 is connected to the gradient circuit 1, 2, 3, 4, and 5. Segment 46 is connected through resistor 4' to shaft 38a which is coupled to shaft 44 through an insulating coupling 45. Shaft 38a carries contact arm 37 which contacts commutator segments 31, 32, 33, 34, 35 and 36. Segment 31 is connected to a temperature indicating device 40, 32 to a pressure indicating device 41, 33 to a humidity indicating device 42, 34 to a second humidity indicating device 43, 35 to a light intensity indicating device 36 for indicating cloud height and thickness and 36 to reference resistor 39. Resistor 4' is a limiting device to hold the modulating frequency within the limits of the recording equipment when the resistance of any measuring devices becomes less than a predetermined value. 42a is a high-resistance shunting the humidity indicating element 42 so that when the resistance of the element increases above a predetermined value the modulating frquency is held within the limits of the recording equipment.

Resistor 43a performs a similar function in connection with humidity element 43. 5' is an R. F. by-pass condenser shunting the meteorological measuring devices.

Segment 48 on selector switch 47a is so placed that arm 47 contacts segment 48 when arm 37 of selector 37a is not in contact with any of the segments of commutator 37a. Thus for each revolution of shafts 44 and 38a, seven differently modulated radio signals are transmitted from the radiosonde each signal measuring a meteorological phenomenon except for the one sent when the reference resistor 39 is in circuit. This latter signal is a reference signal which serves to indicate any drift in the operating characteristics of the radiosonde circuit as a whole.

When only gradient and altitude (pressure) readings are desired a simplified circuit may be employed, making contacts 46 and 48 (Fig. 2) of equal or any other desired relative extent and connecting the lead from element 4' directly to the pressure varied resistance 41, with consequent elimination of switch 37a and other factor responsive elements associated with it. It will be appreciated that any suitable form of switching means may be employed in lieu of the rotary switches 37a and 47a shown.

Fig. 3 shows a standard radiosonde receiver consisting of antenna 50, radio receiver 51, frequency meter 52 and recorder 52a. The latter consists of indicating instrument carrying arm 54 with marking element 55. Motor 60, through its shaft rotates drum 56 which carries recorder paper 58. 59 is a graphical record made by marking element 55.

Fig. 4 shows a typical graphical record of a potential gradient measurement made from a transmitter as shown in Fig. 1 and a receiver as shown in Fig. 3. Here the graph paper 58 indicates zero gradient at its center a + gradient to the right and a − gradient to the left. 59 shows a trace as might be obtained.

Fig. 5 shows the 7 graphical records as might be made by the receiving circuit of Fig. 3 and the transmitter circuit of Fig. 2. Here 61 represents the record for humidity element 42 of Fig. 2; 62 the record for humidity element 43 of Fig. 2; 63 the record for the pressure indicating element 41 of Fig. 2; 64 the record when the reference resistor 39 of Fig. 2 is circuit; 65 the record for the light brightness indicator 38 of Fig. 2 and 66 the record for the potential gradient indicator composed of elements 1, 2, 3, 4 and 5 of Fig. 2, while 67 represents the record for temperature indicator 40 of Fig. 2.

In the balloon-transmitter assembly of Fig. 6, the radiosonde 70, employing gradient collector and transmitting antenna elements according to Figs. 1 or 2, is provided across its top and bottom housing members with spreaders 71, and the collector wires 1 and 2 are tied to the collectors as by cords 72 to mechanically assemble them to the unit 70. The collector 1 is then secured to the balloon 70a to provide for lifting the assembly. The antenna elements 24a, being relatively short for short-wave transmission, say 2 or 3 feet long, may be formed of self-sustaining stiff wires extending from the sonde 70 and preferably secured to alternative ends of the spreaders 71 as shown. The leads 1a and 2a from collectors 1 and 2, in this case, are shown as brought in to the sonde by being carried from the collectors to the other alternative ends of the spreaders, remote from those at which the antenna elements 24a are erected. By the alternative arrangement of the dipole elements 24a and the collector leads 1a, 2a, interference between these elements, in various positions of the sonde is reduced.

A more preferred form of assembly is shown in Fig. 7. In this form the antenna elements 24a and the collectors 1 and 2 are co-linear and the antenna elements 24a serve as leads for the collector elements, being isolated therefrom, so far as the transmitted R. F. is concerned, by impedances 80 and 81, which may be relatively long resistances, say approximately 1 foot long, having values of the order of a megohm or so, ample to choke off the transmitted R. F. but not significantly damping the transmission of the static potential gradient charges. With this arrangement, means is provided in the sonde 70 for separate coupling of the static charges and transmitted R. F. A preferred form of such means is shown in Fig. 8, in which the R. F. coupling coil 25 is divided at its center nodal point, being bridged by small R. F. by-pass condenser 83 which completes the transmitted R. F. circuit while breaking the collector circuit. The collector leads 1a and 2a are taken off across the condenser 83, and are preferably provided with R. F. chokes, as resistors 84, to keep these leads from affecting the tuning of dipole 24a. The leads 1a and 2a may then be bridged by an R. F. by-pass condenser 3, to by-pass any picked-up R. F. which may pass the impedances 84, and supplied with an R. F. choke, as the resistance 4, if desired, before being connected to the terminals of condenser 5, as shown in Fig. 1.

The arrangement of Figs. 7 and 8 affords a simple and mechanically strong assembly, since the leads from coil 25 may be connected to screw sockets or the like rigidly mounted in the housing of the sonde 70, and the elements 24a may take the form of rods which may be screwed or otherwise assembled in such sockets when the instrument is being assembled for flight, and which may have the impedances 71, 72 pre-secured to their outer ends with suitable connecting means for mechanically and electrically connecting them to the collectors 1 and 2.

An alternative arrangement is shown in Fig. 9, in which the elements 80, 81, 83 and 84 are eliminated by employing the outer shell of a coaxial line as the transmitting antenna 24a, and employing the axial conductor of the coaxial line (suitably supported therein by beads 90 of high dielectric value) as the collector leads 1a and 2a. These leads 1a and 2a are brought out through the shell 24a at the nodal point at the center of the coupling coil 25a, preferably each through a separate insulating ferrule, and may pass directly to the by-pass condenser 3 and choke 4 (Fig. 1) as shown. The shell 24a may be closed at its ends by suitable insulating seals, as plastic set up mosses or gobs 91 of poly-styrene or the like, and the leads 1a and 2a may terminate in connector elements 92 extending centrally of the seals 91, and adapted for quick connection to the collector wires 1 and 2. The elements 24a may be provided with any suitable means, as flanges 93, for securing them in the sonde-housing 70.

In the form shown in Fig. 9, to facilitate assembly and shipping, the coaxial dipole elements 1, 24a, are divided, at the sonde housing by coaxial line connectors 24b, so that the portions thereof external of the sonde housing 70 may be disassembled for shipping, and be quickly screwed into place when the device is to be used. Also as shown, the portion of the coaxial dipole 24a internal of the sonde housing is preferably made in two sections, each comprising half of the antenna coupling coil 25a and each terminated by a plastic insulating member, as gob 94, to seal and insulate leads 1a, 2a. In assembly, means is provided for completing the dipole-circuit, herein shown as a solder-lug 95, electrically unitizing the two sections of the coupling coil 25a.

As will be appreciated by those skilled in the art, while I have illustrated the radiosonde circuit as one employing 100% amplitude modulation of a fixed carrier, the invention may be employed with other forms of transmitting circuit, as a partial amplitude modulation circuit, or a frequency-modulated circuit, for examples.

From the foregoing description it will be appreciated that various modifications may be made without departing from the invention exemplified in the preferred embodiments disclosed.

What is claimed is:

1. In a radiometeorograph or the like, an electrical circuit, and a potential gradient collector connected in said electric circuit comprising a pair of conductors arranged divergently to extend through relatively displaced zones of space, radio-frequency by-pass elements connected across said conductors and circuit, and a radio-frequency impedance connected between said conductors and said circuit, whereby the potentials applied to said circuit by said collectors correspond to the static potential differences between said zones, substantially uninfluenced by radio-frequency waves therein.

2. A radiometeorograph system of the type having a radio-transmitter, a transmitting doublet energized thereby, a control circuit for said transmitter and a potential gradient collector comprising a pair of conductors arranged divergently to extend through relatively displaced zones of space and connected to apply to said control circuit controlling potentials corresponding to the static potential differences between said zones; in which said collector conductors are arranged substantially coaxially with respect to the elements of said doublet and in which said doublet comprises the outer shell of said coaxial arrangement.

3. A radiometeorograph system of the type having a radio-transmitter, a transmitting doublet energized thereby, a control circuit for said transmitter and a potential gradient collector comprising a pair of conductors arranged divergently to extend through relatively displaced zones of space and connected to apply to said control circuit controlling potentials corresponding to the static potential differences between said zones; in which said collector conductors are arranged as co-linear extensions of said doublet elements and are separated therefrom as regards the radio-frequency transmitted by said doublet by the interposition of radio-frequency impedances between said doublet terminals and said extensions.

4. In a device of the class described, a radio-transmitter having a transmitting antenna, a control circuit for said transmitter, a potential gradient collector comprising a pair of divergent conductors connected to apply to said control circuit static potentials corresponding to static potential differences between the zones of space traversed by said respective conductors, said transmitting antenna being in the form of a doublet and said collector being arranged as a doublet extending coaxially of said transmitting doublet, and means for excluding from said control circuit radio-frequency potentials picked up by said collector.

5. In a device of the class described, a radio-transmitter having a transmitting antenna, a control circuit for said transmitter, a potential gradient collector comprising a pair of divergent conductors connected to apply to said control circuit static potentials corresponding to static potential differences between the zones of space traversed by said respective conductors, said transmitting antenna being in the form of a doublet and said collectors being arranged as extensions of said doublet, co-linear therewith, and isolated therefrom for radio-frequency by interposed radio-frequency impedances, means coupling said doublet to said transmitter, means coupling said collector to said control circuit, and means for excluding from said control circuit radio-frequency potentials picked up by said collector.

6. In a device of the class described, a radio-transmitter having a transmitting antenna, a control circuit for said transmitter, a potential gradient collector comprising a pair of divergent conductors connected to apply to said control circuit static potentials corresponding to static potential differences between the zones of space traversed by said respective conductors, said transmitting antenna being in the form of a tubular doublet, and said collector conductors being arranged as a doublet co-linear therewith and with their leads extending coaxially of said tubular doublet to the midpoint thereof, insulated therefrom and extending from said tubular doublet adjacent said midpoint for connection to said control circuit, means coupling said doublet to said transmitter, and means associated with said collector leads for excluding from said control circuit radio-frequency potentials picked up by said collector.

7. A device according to claim 6, in which said tubular doublet is divided at its midpoint, in which said collector leads extend from the ends of said divided sections and are insulated therefrom, and in which said divided sections are electrically connected adjacent said ends.

FRANCIS W. DUNMORE.

REFERENCES CITED

The following references are of record in the file of this patent:

UNITED STATES PATENTS

| Number | Name | Date |
| --- | --- | --- |
| 1,919,215 | Gunn | July 25, 1933 |
| 1,938,136 | Crew | Dec. 5, 1933 |
| 2,155,821 | Goldsmith | Apr. 25, 1939 |
| 2,283,919 | Diamond et al. | May 26, 1942 |

OTHER REFERENCES

"The Radio Sonde," Proc. I. R. E., September 1943, pp 479 to 485, Pickering, Copy in 250–17.01.